United States Patent [19]
Krupke et al.

[11] Patent Number: 5,541,948
[45] Date of Patent: Jul. 30, 1996

[54] TRANSITION-METAL DOPED SULFIDE, SELENIDE, AND TELLURIDE LASER CRYSTAL AND LASERS

[75] Inventors: William F. Krupke, Pleasanton; Ralph H. Page, San Ramon; Laura D. DeLoach, Manteca; Stephen A. Payne, Castro Valley, all of Calif.

[73] Assignee: The Regents of the University of California, Oakland, Calif.

[21] Appl. No.: 346,457

[22] Filed: Nov. 28, 1994

[51] Int. Cl.$^6$ ........................................................ H01S 3/16
[52] U.S. Cl. ............................................ 372/41; 372/68
[58] Field of Search .................................. 372/41, 68, 92

[56] References Cited

U.S. PATENT DOCUMENTS

| | | | |
|---|---|---|---|
| 4,000,247 | 12/1976 | Yamada et al. | 372/41 |
| 4,081,763 | 3/1978 | Vlasenko et al. | 372/92 |
| 4,377,864 | 3/1983 | McCollum et al. | 372/41 |
| 4,627,064 | 12/1986 | Auzel et al. | 372/41 |
| 4,648,094 | 3/1987 | McCollum et al. | 372/41 |
| 4,935,934 | 6/1990 | Ferrand et al. | 372/41 |
| 4,987,575 | 1/1991 | Alfano et al. | 372/41 |
| 5,140,604 | 8/1992 | Alablanche et al. | 372/41 |
| 5,166,948 | 11/1992 | Gavrilovic et al. | 372/41 |
| 5,173,911 | 12/1992 | Faure et al. | 372/41 |
| 5,287,373 | 2/1994 | Rapoport et al. | 372/41 |
| 5,319,653 | 6/1994 | Favennec et al. | 372/41 |
| 5,422,907 | 6/1995 | Bhargava | 372/68 |

*Primary Examiner*—Leon Scott, Jr.
*Attorney, Agent, or Firm*—Henry P. Sartorio

[57] ABSTRACT

A new class of solid state laser crystals and lasers are formed of transition metal doped sulfide, selenide, and telluride host crystals which have four fold coordinated substitutional sites. The host crystals include II–VI compounds. The host crystal is doped with a transition metal laser ion, e.g., chromium, cobalt or iron. In particular, $Cr^{2+}$-doped ZnS and ZnSe generate laser action near 2.3 μm. Oxide, chloride, fluoride, bromide and iodide crystals with similar structures can also be used. Important aspects of these laser materials are the tetrahedral site symmetry of the host crystal, low excited state absorption losses and high luminescence efficiency, and the $d^4$ and $d^6$ electronic configurations of the transition metal ions. The same materials are also useful as saturable absorbers for passive Q-switching applications. The laser materials can be used as gain media in amplifiers and oscillators; these gain media can be incorporated into waveguides and semiconductor lasers.

20 Claims, 7 Drawing Sheets

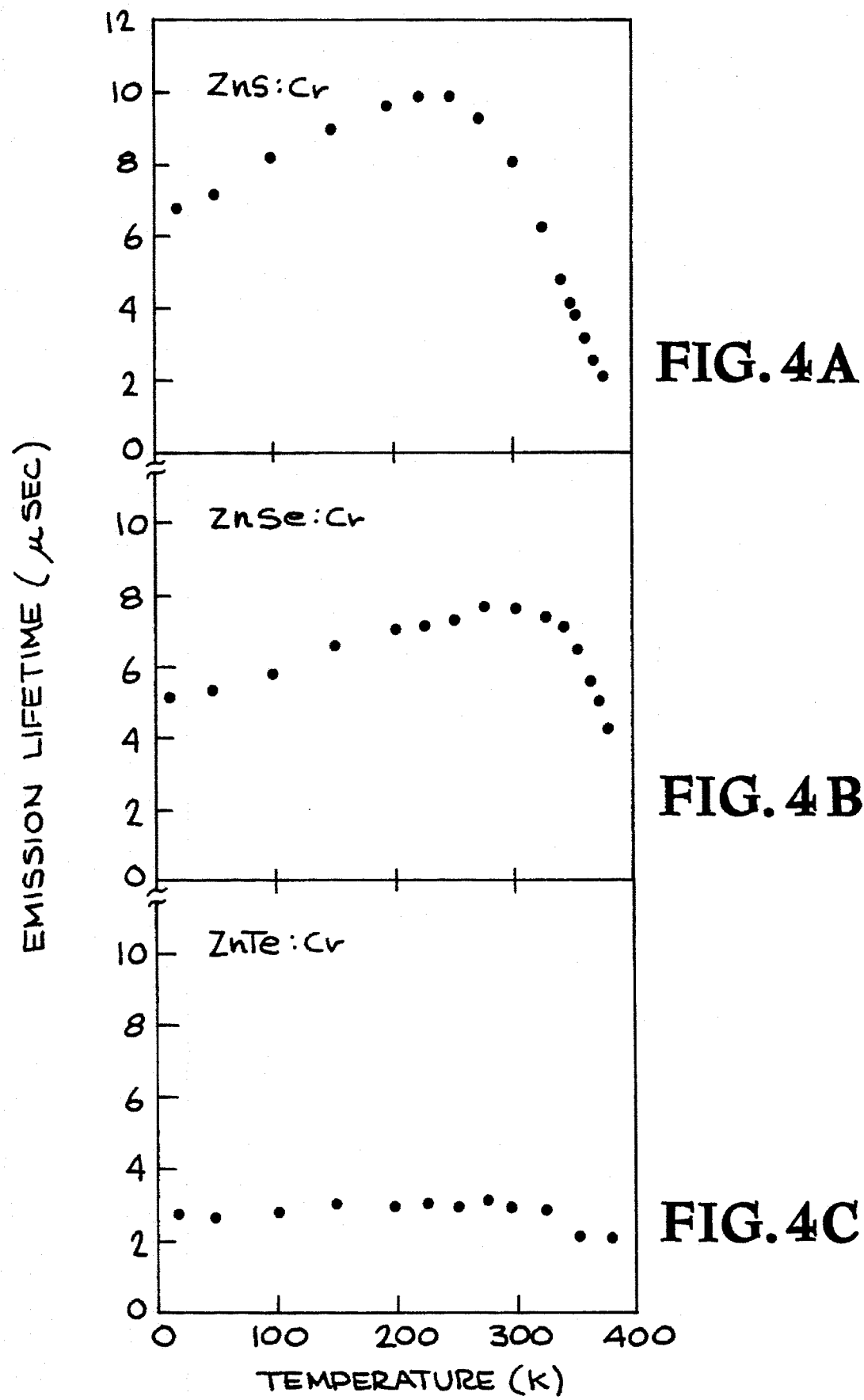

TRANSITION-METAL DOPED SULFIDE, SELENIDE, AND TELLURIDE LASER CRYSTAL AND LASERS

The U.S. Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The invention relates generally to solid state lasers, and more particularly to solid state laser materials.

2. Description of Related Art

Fluoride and oxide crystals doped with transition metal ions have long been known to serve usefully as laser materials. The first laser was a flashlamp-pumped ruby, which is $Cr^{3+}$-doped $Al_2O_3$ [Maiman, "Stimulated optical radiation in ruby," Nature 187, 493 (1960)]. The $Cr^{3+}$ dopants color the $Al_2O_3$ crystals (sapphire) pink or red, and are responsible for the laser activity of the medium. While the ruby laser once aroused much interest and exploration, it ultimately proved to be of limited utility. One limitation of the material is its narrow gain spectrum (centered at 692 nm); a broader gain spectrum would prove to be more useful.

The first broadly tunable gain media, based on the transition metal ions $Ni^{2+}$, $Co^{2+}$ and $V^{2+}$, were discovered by L. Johnson and coworkers [L. F. Johnson et al., "Phonon terminated optical masers," Phys. Rev. 149, 179 (1966); also Auzel et al., U.S. Pat. No. 4,627,064]. Again, these lasers did not turn out to be of substantial practical interest since several fundamental issues limit their utility. For example, both $Ni^{2+}$ and $V^{2+}$-based lasers tend to operate with low efficiency [S. A. Payne et al., "Excited state absorption spectra of $V^{2+}$ in $KMgF_3$ and $MgF_2$," Phys. Rev. B 37, 998 (1988); S. A. Payne, "Energy level assignments for $^1E$ and $^3T_{1a}$ states of $MgO:Ni^{2+}$," Phys. Rev. B 41, 6109 (1990)], because of interference from excited state absorption and due to losses arising from nonradiative decay. Excited state absorption (ESA) is a process where light at the laser wavelength experiences absorption from the excited state to a higher lying excited state, thereby inducing loss rather than gain (where the excited state is stimulated to radiate back to the ground state). Nonradiative decay is also detrimental to the operation of the laser since the energy stored in the excited states that are produced lead to heat generation, rather than to light (and therefore to gain). $Co^{2+}$-based lasers such as $Co:MgF_2$ experience low ESA loss although the nonradiative decay is substantial [D. M. Rines et al., "High energy operation of a $Co:MgF_2$ laser," Opt. Lett. 19, 628 (1994)]. Rines et al. has shown that the $Co:MgF_2$ laser can operate efficiently if it is pumped with a ~50 μsec pulse from a 1.3 μm Nd:YAG laser, although the overall efficiency of this laser-pumped laser system remains low.

Lasers based on the $Cr^{3+}$ ion have proved to be the most useful laser systems. Although $Cr^{3+}$ tends to incur little nonradiative decay at room temperature in most oxide and fluoride crystal hosts, the ESA losses are found to vary significantly depending on the particular host medium [Caird et al., "Quantum electronic properties of the $Na_3Ga_2Li_3F_{12}:Cr^{3+}$ laser," IEEE J. Quantum Electron. 24, 1077 (1988)]. Examples of $Cr^{3+}$-lasers include alexandrite (Walling et al., U.S. Pat. No. 4,272,733 and Morris et al., U.S. Pat. Re 31,057), $Cr:SrAlF_5$ (Jenssen, U.S. Pat. No. 4,599,727), $Cr:Y_3Ga_5O_{12}$ (Walling et al., U.S. Pat. No. 4,490,822), emerald (Alfano et al., U.S. Pat. No. 4,464,761), Cr-doped germanate oxides (McCollum et al., U.S. Pat. No. 4,648,094), $Cr:ScBO_3$ (Chai et al., U.S. Pat. No. 4,841,530), Cr-doped elpasolite crystals (McCollum et al., U.S. Pat. No. 4,377,864), and Cr-doped $LiCaAlF_6$ and $LiSrAlF_6$ (Cr:LiSAF) [Payne et al., U.S. Pat. No. 4,811,349 and Krupke et al., U.S. Pat. No. 5,105,434]. Of these Cr-lasers, only alexandrite and Cr:LiSAF are routinely employed in applications. The $Ti^{3+}$ transition metal ion has also been found to offer useful laser properties in the $Al_2O_3$ (sapphire) host [P. F. Moulton, "Spectroscopic and laser characteristics of $Ti:Al_2O_3$," J. Opt. Soc. Am. B 3, 125 (1986)]. Ti:sapphire lasers are efficient and broadly tunable from 0.7–1.1 μm.

All of the examples cited above entail crystals where the transition metal ion is coordinated by six fluorines or six oxygens in an octahedral site. While the known laser materials based on transition metal ions overwhelmingly involve octahedral coordination of the laser ions, there are a few examples where tetrahedral, or four-fold coordinated, sites are employed. The main transition metal ions of this nature include $Cr^{4+}$, and to a lesser extent, $Mn^{5+}$ (Alfano, U.S. Pat. No. 4,932,031 and Alfano, U.S. Pat. No. 4,987,575). The present invention is based on transition metal ions that are incorporated onto tetrahedral sites.

Bishop et al. disclose lasers based on transition metal ions doped into III–V compounds, and cite a particular embodiment as involving Fe in InP [Bishop et al., U.S. Pat. No. 4,158,207]. The III–V notation refers to the number of valence electrons in the neutral state of the cation (e.g., In with three electrons) and for the anion (e.g., P with five electrons). In contrast, the present invention involves so-called II–VI compounds such as ZnS.

Transition metal ion dopants in II–VI compounds emitting in the visible spectral range have previously been recognized to serve usefully in fluorescence display materials (e.g., Goede et al., German Patent No. DD 251,153; Mullermach et al., German Patent No. DD 255,429; and Japanese Patent Nos. JP 56088487 and JP 85008073). In these cases, the transition metal doped II–VI compounds are considered for electroluminescence behavior rather than as laser materials.

The scientific literature contains many references to the optical properties of transition metal ions in II–VI compounds although their potential for laser action was never recognized. Weakliem's classic paper from 1962 reports the absorption spectra of $Ni^{2+}$, $Co^{2+}$ and $Cu^{2+}$ in crystals such as ZnO, ZnS and CdS [Weakliem, "Optical spectra of $Ni^{2+}$, $Co^{2+}$ and $Cu^{2+}$ in tetrahedral sites in crystals," J. Chem. Phys. 36, 2117 (1962)]. Weakliem investigates the nature of the energy levels, establishes their electronic symmetries, and provides a theoretical basis for their absorption strength. Other examples of related studies include: Vallin et al., "Infrared absorption in some II–VI compounds doped with Cr," Phys Rev. B 2, 4313 (1970); and Pappalardo et al., "Absorption spectra of transition ions in CdS crystals," Phys. Rev. 123, 1188 (1961). Furthermore, the scientific literature contains numerous reports of the infrared luminescences arising from II–VI compounds doped with transition ions. Since the researchers' main objective involved the exploration of fundamental physics issues, most of the luminescence data was recorded below room temperature where the spectra can be better resolved. Some previously-reported data include: Kaminska, "Absorption and luminescence of $Cr^{2+}$ ($d^4$) in II–VI compounds," J. Phys. C: Solid State 12, 2197 (1979); Radlinski, "Infrared luminescence of cobalt impurities in II–VI compounds," J. Luminescence 18/19, 147 (1979); and Slack et al., "Infrared luminescence of $Fe^{2+}$ in ZnS," Phys. Rev. 163,335 (1967). Additional work on other types of transition metal-doped sulfides have been reported, such as $ZnGa_2S_4$ [H. Park et al., "Transition behavior of $Mn^{2+}$- and $Ni^{2+}$-doped $ZnGa_2S_4$ crystals," Phys. Stat. Sol. B 180, K69 (1993)]. Finally, the observed emission lifetime is a useful quantity from which to judge the potential for laser action, since in some circumstances it may be employed to calculate the emission cross section. Moreover, when the emission lifetime is recorded as a function of temperature, an abrupt decrease in the emission lifetime with rising temperature may be interpreted as the onset of non-radiative decay (i.e., the decrease in luminescence yield). Several papers have appeared on this topic, including: Dubenski, "Luminescence and absorption associated with the lower terms of $Co^{2+}$ and $Ni^{2+}$ ions in single crystal ZnS," Optics and Spectroscopy 19, 353 (1965); Renz et al., "Temperature dependence of the lifetime of excited states for 3d transition element centres in II–VI crystals," J. Luminescence 24/25, 221 (1981); and Radlinski, "Position of the $Co^{2+}$ level in wide-gap II–VI semiconductors," J. Phys. C: Solid State 12, 4477 (1979).

The survey of the scientific literature described above has been combined and reinterpreted in the present invention to predict that transition metal-doped II–VI compounds can serve as lasers. These basic spectroscopy studies have been pursued for more than three decades now without any previous indication that they are active laser media. This occurrence is not surprising, in that laser action requires that many factors be favorable, such as the existence of low ESA losses and high luminescence efficiency (low nonradiative decay); the availability of high optical quality material with the required doping level; and adequate pump sources. The present invention brings all the factors together to produce a new class of laser materials and lasers.

SUMMARY OF THE INVENTION

Accordingly, it is an object of the invention to provide a new class of solid state laser materials, based on transition metal-doped sulfide, selenide and telluride crystals. The crystals are selected to offer tetrahedral sites (fourfold coordinated) into which the dopants are incorporated. Said crystals may be selected from II–VI compounds having the general formula MX, where M =Zn, Cd, Mg and X=S, Se, Te and other sulfide, selenide and telluride crystals, e.g., $MY_2X_4$ where: M=Zn, Cd, Ca, Sr, Ba, Y=Ga, In and X=S, Se, Te. One particular embodiment of this invention is $Cr^{2+}$-doped crystals, such as ZnS, ZnSe, ZnTe, CdS, CdSe, CdTe, $CaGa_2S_4$, $CaGa_2Se_4$, $CdGa_2S_4$ and $CdGa_2Se_4$. Other laser ions include $Fe^{2+}$ and $Co^{2+}$. The laser materials may be arranged in laser systems, as a thin-film waveguide structure, or as the active medium in a laser diode. Furthermore, said gain medium may be pumped by other laser diodes.

Another object of the invention is to provide $Cr^{2+}$-doped host crystals possessing substitutional tetrahedral sites, including oxides, fluorides, chlorides, bromides and iodides, in addition to the aforementioned sulfides, selenides and tellurides.

It is an additional object of this invention to provide laser crystals with tetrahedrally coordinated transition metal ions having ground and excited states with electronic symmetries selected from the $^5E$ and $^5T_2$ descriptions and transition metal ions characterized by the $3d^4$, $4d^4$, $5d^4$, $3d^6$, $4d^6$ and $5d^6$ electronic configurations.

It is also an object of the invention to provide new saturable absorber media comprising transition metal ion dopants in II–VI compounds. Preferred embodiments of said saturable absorber media include $Cr^{2+}$ or $Fe^{2+}$ in ZnS, ZnSe, ZnTe, CdS, CdSe and CdTe.

BRIEF DESCRIPTION OF THE DRAWINGS

FIGS. 4a, b, c are plots of the emission lifetimes of the $Cr^{2+}$ dopant in ZnS, ZnSe and ZnTe as a function of temperature.

DETAILED DESCRIPTION OF THE INVENTION

Figures 1A, 1B, 1C:
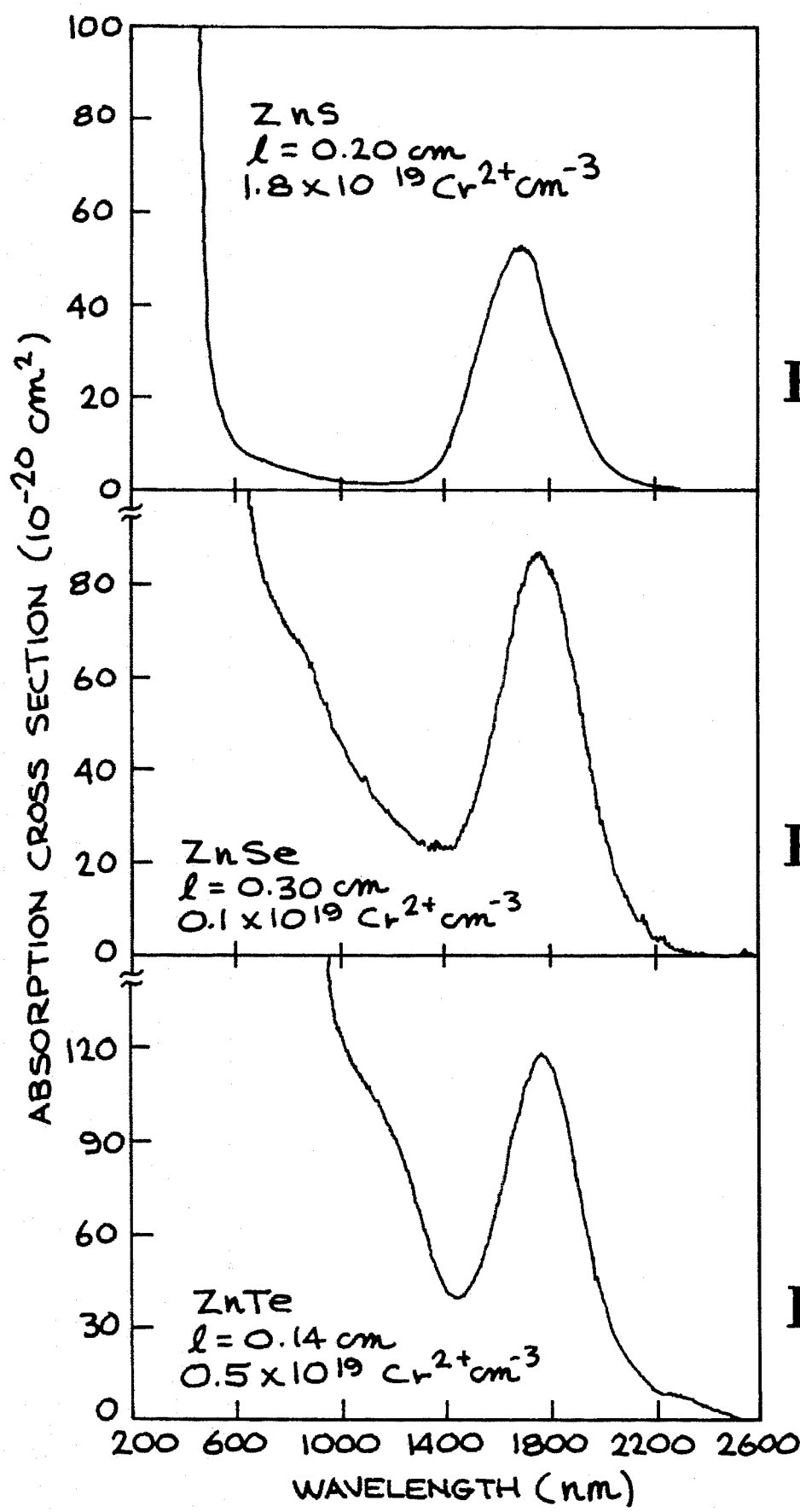
FIGS. 1a, b, c show the room temperature absorption spectra of $Cr^{2+}$ dopants in ZnS, ZnSe and ZnTe.

The invention is a solid state laser material and laser comprised of transition metal doped II–VI compounds. The invention includes transition metal-doped sulfide, selenide, and telluride materials (also referred to as chalcogenides). Furthermore, the invention includes the $Cr^{2+}$, $Co^{2+}$, $Fe^{2+}$ and other transition metal ions in sulfide, selenide, telluride and other host crystals offering tetrahedral (four-fold coordinated) substitutional sites, into which the transition metal ions can be incorporated. Embodiments include $Cr^{2+}$, $Co^{2+}$ or $Fe^{2+}$ in the zinc chalcogenides, cadmium chalcogenides, $CdGa_2S_4$, $CaGa_2S_4$, and other chalcogenide crystals. One particular embodiment of the invention is $Cr^{2+}$-doped ZnS, ZnSe or ZnTe. In these cases the $Cr^{2+}$ ions substitute for the $Zn^{2+}$ host ion and thereby occupy a tetrahedral four-fold coordinated site. The absorption spectra of the crystals are shown in FIGS. 1a, b, c. The main absorption band occurring in the 1.5–2.0 μm region arises from the $^5E \rightarrow 5T_2$ transition. This transition is spin-allowed, although all other transitions originating from the $^5E$ ground state are spin forbidden. As a result, the spin allowed transition appears more predominantly than any of the other possible features, as is apparent from the data in FIGS. 1a, b, c.

Figure 2:
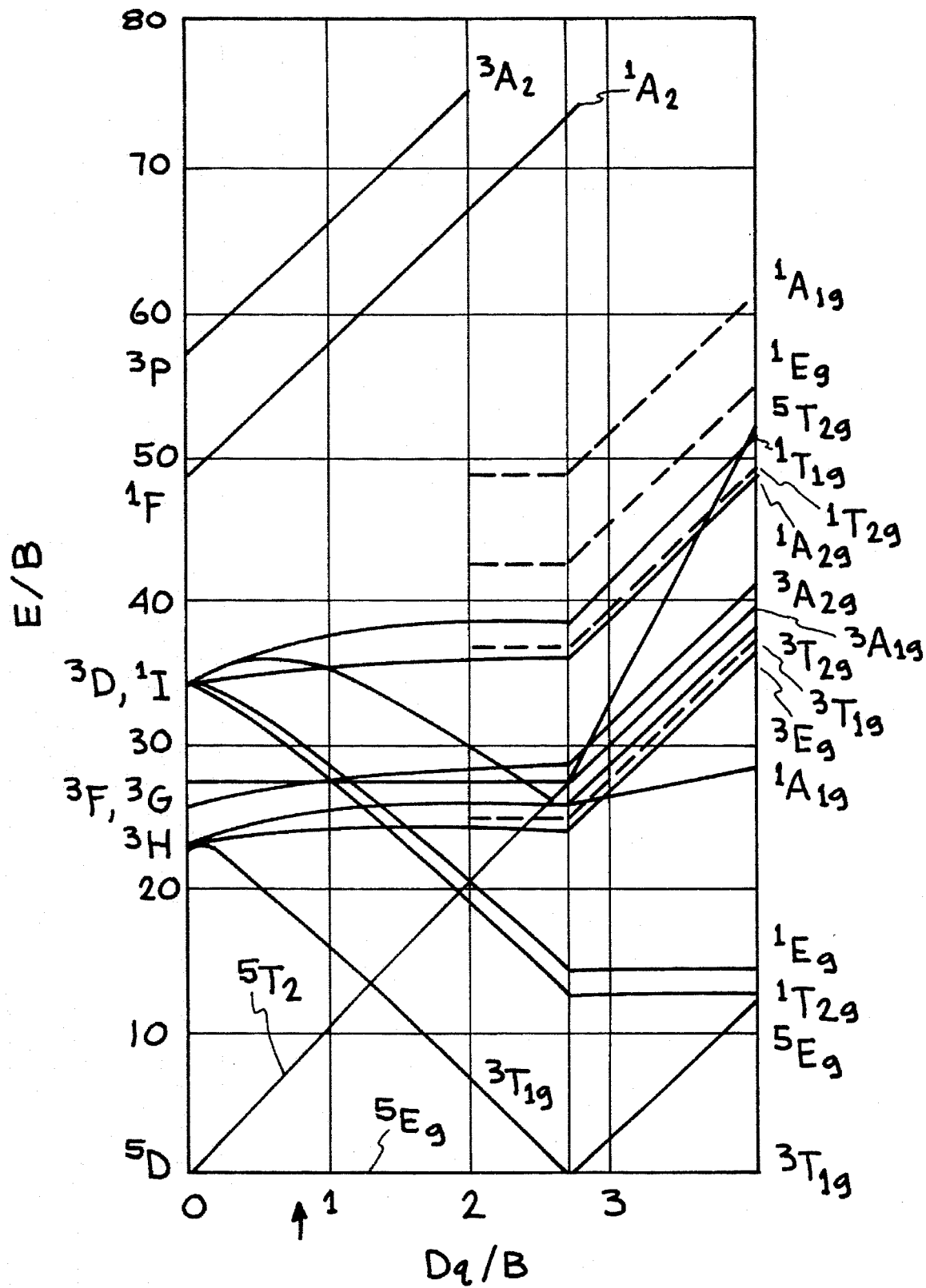
FIG. 2 is a Tanabe-Sugano diagram that describes the energy levels of a $d^4$ transition metal ion in tetrahedral symmetry.

The energy levels of $Cr^{2+}$ can be understood on the basis of the well-known Tanabe-Sugano diagram, as is reproduced in FIG. 2. The ordinate of this plot is the normalized energy levels of the $Cr^{2+}$ electronic states while the abscissa is a measure of the tetrahedral field strength experienced by the $Cr^{2+}$ ion. The far left of the abscissa represents the free-ion levels while the crystal field strength increases in proceeding to the right-hand side; (the arrow denotes the approximate field relevant to the $Cr^{2+}$-doped II–VI compounds). By examining the Tanabe-Sugano diagram it becomes clear that the ground and lowest excited state are spin quintets ($^5E$ and $^5T_2$), while all of the higher lying excited states are triplets and singlets (denoted as superscript "3" or "1"). Again, since the strongest transitions are those for which the spin remains unchanged (i.e., spin-allowed), the absorption spectra of FIGS. 1a, b, c reveal that the $^5E \rightarrow ^5T_2$ transition of FIG. 2 gives rise to the strongest feature; the other electronic transitions to shorter wavelengths induce a featureless background level until the band edge of the host medium is reached.

Figures 3A, 3B, 3C:
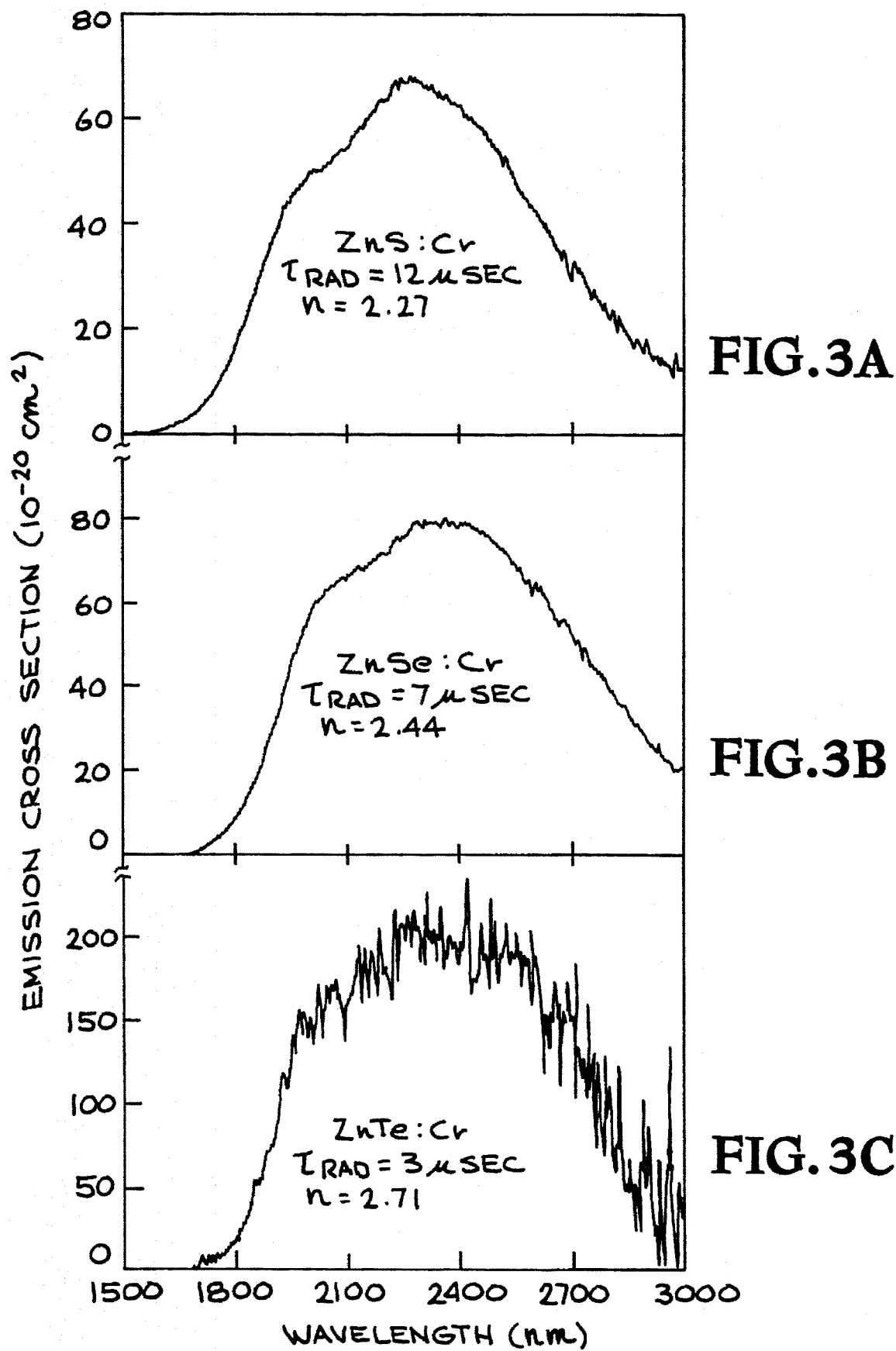
FIGS. 3a, b, c depict the emission spectra of $Cr^{2+}$ dopants in ZnS, ZnSe and ZnTe at room temperature.

From the emission spectra of the $Cr^{2+}$-doped II–VI compounds as shown in FIGS. 3a, b, c, it is seen that the cross section values are comparable to those displayed in the absorption spectra of FIGS. 1a, b, c. This is the case because the emission process is the inverse of the absorption band, or the $^5T_2 \rightarrow ^5E$ transition. From this information it is deduced, according to the invention, that all transitions from the $^5T_2$ lowest excited state to any of the higher lying excited states (known as excited state absorption or ESA) are necessarily spin-forbidden and weaker in cross section. Accordingly, the ESA cross section can be expected to be less than that of the emission cross sections. As discussed above, low ESA losses are one of the crucial requirements for a favorable laser material.

As was also noted above, it is desirable for a laser material to emit efficiently at room temperature. One way to test for the influence of nonradiative decay on the luminescence yield is to examine the emission lifetime as a function of temperature. If the lifetime is found to abruptly decrease as the temperature rises, this observation can often be interpreted as the onset of nonradiative decay (where the energy in the lowest excited state is degraded to heat, rather than emitted as light). In consideration of the lifetime-versus-temperature plots for $Cr^{2+}$ in ZnS, ZnSe and ZnTe in FIGS. 4a, b, c, it may be concluded that nonradiative decay is essentially minor at 300K (room temperature) for these crystals. These data offer further evidence that the $Cr^{2+}$-doped II–VI compounds should serve usefully as 2.2–3.0 μm infrared laser materials.

It is worthwhile to consider the fundamental physical basis of the highly efficient room temperature luminescence. The high efficiency can be attributed, in part, to the tetrahedral symmetry of the lattice site into which the $Cr^{2+}$ ion is incorporated. The tetrahedral four-fold coordinated site does not possess a center of inversion and therefore induces a strong dipole moment into the emission transition. The resulting greatly enhanced emission rates can accordingly compete more effectively with the temperature-dependent nonradiative decay rate.

The tetrahedral character of the site in the II–VI compound is, in fact, one of the key features of this new class of laser materials. (Recall that virtually all existing laser hosts for transition metal ions are based on octahedral, or sixfold coordinated sites.) The tetrahedral sites also lead to a crystal field strength that is substantially weaker than that of octahedral sites, thereby shifting the emission band into the technologically important mid-infrared region (i.e., the Dq/B value of FIG. 2 is smaller for tetrahedral sites).

Figure 5:
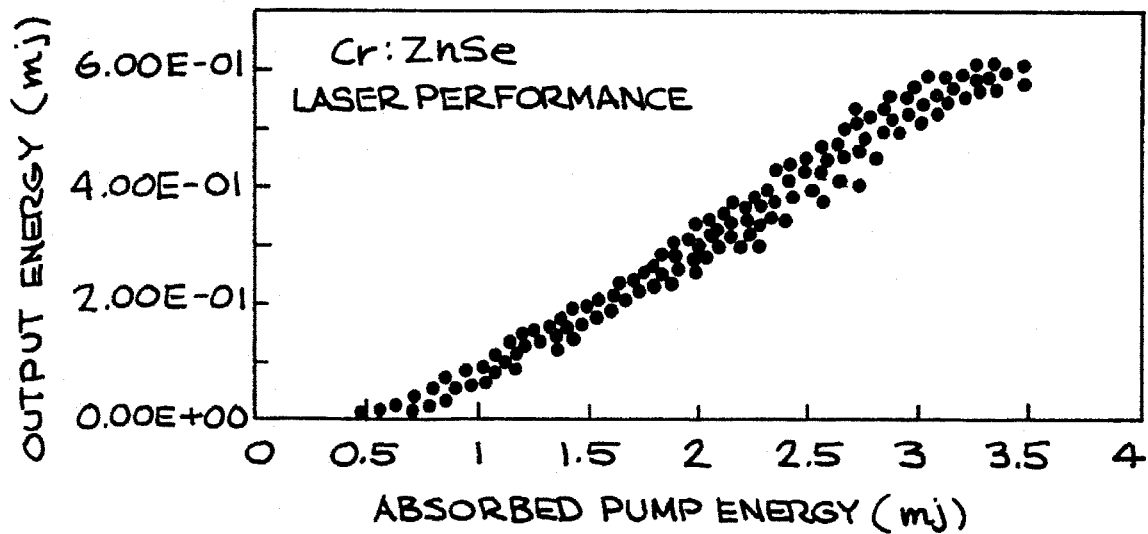
FIG. 5 is a plot of the 2.3 μm output energy generated from a $Cr^{2+}$:ZnSe laser as a function of the 1.8 μm pump energy.

The $Cr^{2+}$:ZnSe crystal has been demonstrated to lase using a straightforward laser cavity configuration, in which the Cr:ZnSe crystal was placed symmetrically between two parallel mirrors. One mirror is highly-reflecting at the peak emission wavelength of 2.3 μm, while the other cavity mirror (i.e., the output coupler) transmits about 8% at 2.3 μm. A commercial Co:$MgF_2$ laser operating at 1.8 μm is employed as the pump source. The results of the $Cr^{2+}$:ZnSe laser demonstrations are displayed in FIG. 5, where it is seen that the conversion efficiency for 2.3 μm output energy compared to the absorbed 1.8 μm pump energy is about 20%. This data definitively proves that the $Cr^{2+}$-doped II–VI compounds represent a new class of laser materials. It furthermore broadly suggests that other transition metal ions in these II–VI crystals as well as other related materials may prove useful as lasers.

The $3d^4$ electronic structure of $Cr^{2+}$, together with the tetrahedral environment, gives rise to the energy levels depicted in FIG. 2. This favorable energy level structure can also be realized on the basis of second or third row transition metal ions having the $4d^4$ and $5d^4$ electronic configurations. Moreover, other first row transition metal ions having the $3d^4$ configuration may prove useful, such as $Mn^{3+}$. While requiring that these transition metal ions be located in a lattice site of tetrahedral-type symmetry, there is no physical reason to limit the invention to the II–VI sulfide, selenide or telluride compounds noted above. For example, CdS, CdSe, and CdTe are well-known compounds that may prove useful. More complex crystals such as $ZnGa_2S_4$, $CaGa_2S_4$, $ZnGa_2Se_4$, $CdGa_2S_4$, $CaGa_2Se_4$, and $CdGa_2Se_4$ may also be worthwhile. Oxides, fluorides, chlorides, bromides and iodides are also worthy of consideration if they have the appropriate tetrahedral sites available for substitution by transition metal ions.

Fundamental theories of symmetry indicate that the $d^6$ electronic structure offers many of the same features and advantages as the $d^4$ configuration discussed above. For the case of the $d^6$ configuration the ground and excited states become inverted (i.e., $^5T_2$ ground state and $^5E$ lowest excited state), while again all of the higher lying excited states are triplets and singlets such that all ESA transitions are spin-forbidden and weak. For these reasons $Fe^{2+}$ is expected to serve as a useful laser ion in II–VI compounds, because its electronic properties are, in many ways, analogous to those of $Cr^{2+}$.

Figures 6A, 6B, 6C:
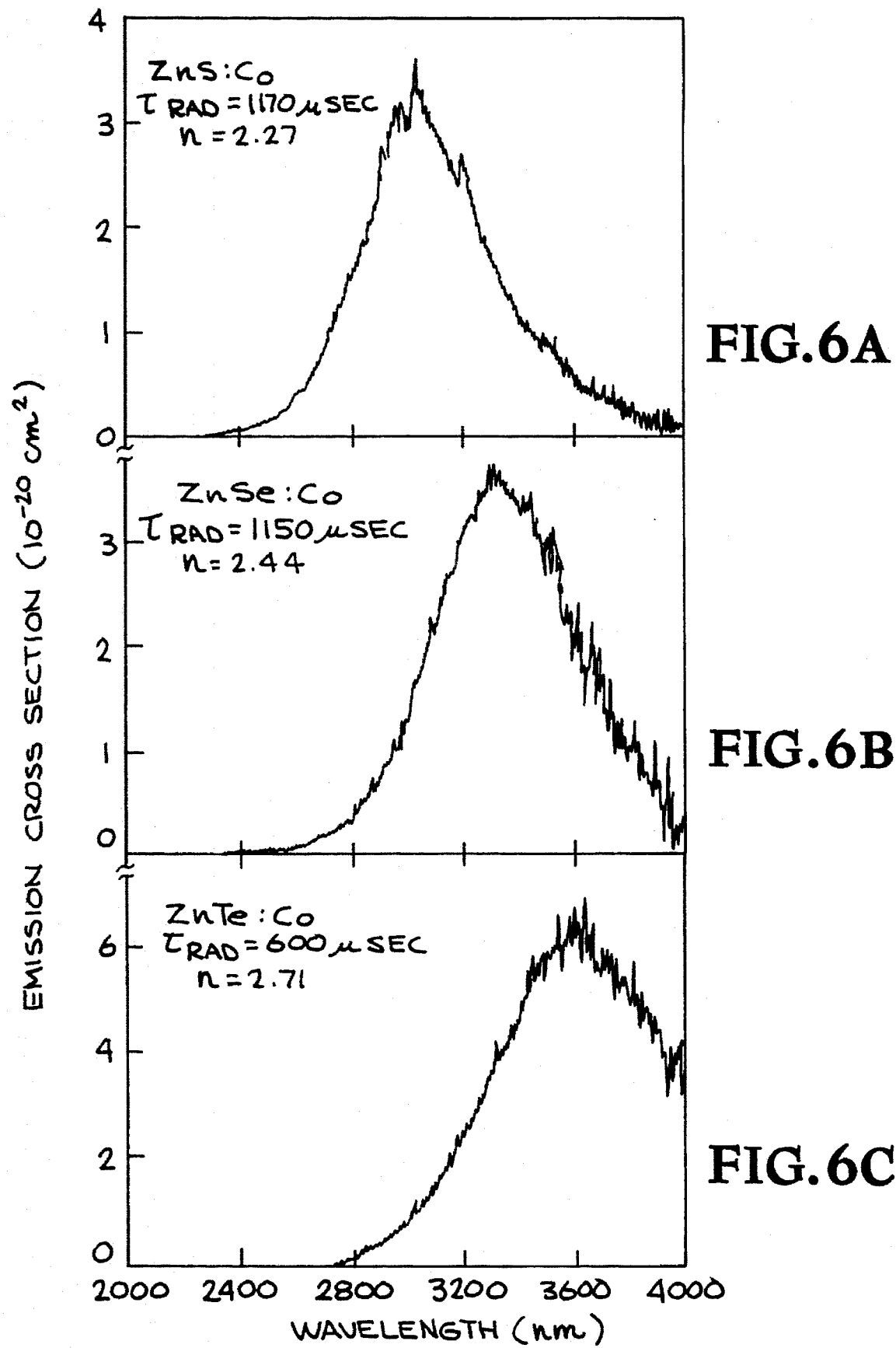
FIGS. 6a, b, c display the room temperature emission spectra obtained from $Co^{2+}$-doped ZnS, ZnSe and ZnTe.
Figures 7A, 7B, 7C:
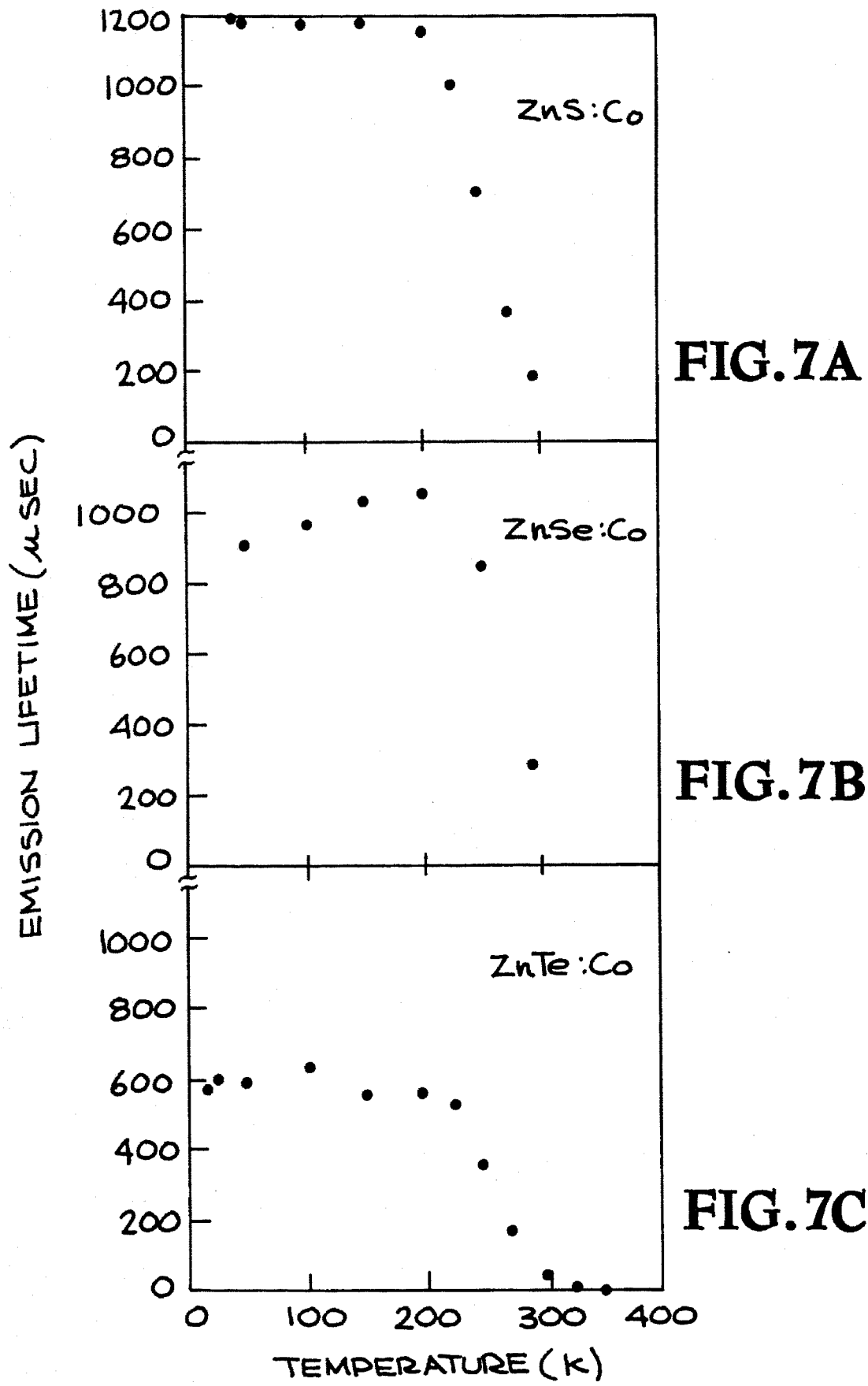
FIGS. 7a, b, c are plots of the emission lifetimes of the $Co^{2+}$ dopant in ZnS, ZnSe and ZnTe as a function of temperature.

The emission spectra of the $Co^{2+}$ transition metal ion in ZnS, ZnSe and ZnTe are displayed in FIGS. 6a, b, c, from which it is deduced that these materials could potentially lase in the 3–4 μm region. Upon closer examination of these data, it is noticed that the emission cross sections are much smaller than the values observed for $Cr^{2+}$ in FIGS. 3a, b, c. The low emission cross section evidenced by the $Co^{2+}$-doped crystals can be interpreted to suggest that ESA transitions may overwhelm any prospect for laser action in the 3–4 μm region. On the other hand, the emission band may occur in a region for which ESA losses are fortuitously low. The emission lifetimes of the $Co^{2+}$-doped II–VI crystals are plotted in FIGS. 7a, b, c, where it is seen that the emission lifetime decreases abruptly somewhat below room temperature. The strong influence of nonradiative decay at room temperature is likely to adversely impact the prospects for laser action among the $Co^{2+}$-doped materials.

Figure 8:
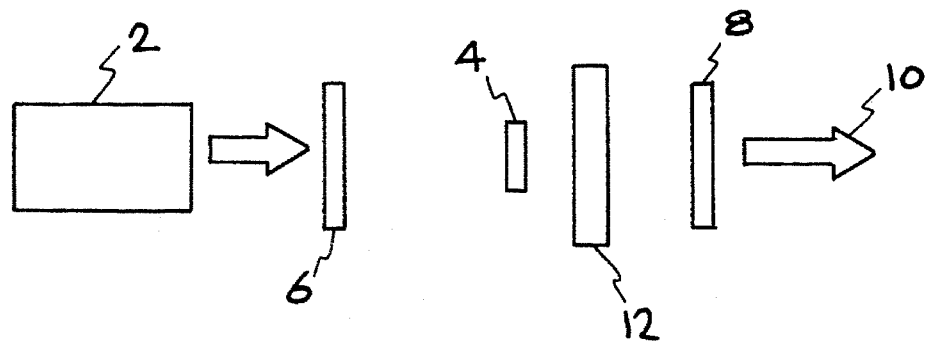
FIG. 8 shows a generic laser apparatus into which the new class of laser materials can be incorporated.

The laser apparatus into which the new laser materials may be incorporated is illustrated schematically in FIG. 8. In this particular embodiment, the pump source (2) can be a laser diode, a laser diode array, or another laser arranged to longitudinally pump the gain medium (4) through the resonator mirror (6). The gain medium may also be fabricated as a waveguiding structure or simply as a bulk material. The output coupling mirror (8) is carefully aligned to form the laser resonator. The output beam (10) is generated by energizing the gain medium with the pump source. Alternative embodiments of the laser apparatus entail pumping transverse to the optic axis of the cavity and the use of flashlamps instead of laser sources. Additional optics (12) may be included in the cavity in order to Q-switch, modelock, wavelength tune, line-narrow or otherwise manipulate the properties of the laser beam that is generated by the apparatus. The gain medium can be utilized in a laser amplifier (instead of an oscillator), wherein an injected beam is enhanced in energy or power.

Another embodiment of the invention can involve a laser diode device, where the gain medium serves as the active element and is energized by passing current through the lasing region. In a common type of laser diode architecture the transition metal doped II–VI compound is sandwiched between n- and p-type semiconductor materials.

A final embodiment of this class of materials involves its use as saturable absorbers. This application of the materials is related to their use as gain media in that both applications require that there be low ESA loss at the pump wavelength, and that the cross sections be large (as occurs for lattice sites of tetrahedral symmetry). This type of scenario can be realized for the $Cr^{2+}$ and $Fe^{2+}$-doped crystals, since the prominent absorption feature offers a large cross section, while all of the ESA transitions are expected to be weak and spin-forbidden.

A saturable absorber, when placed in a laser cavity of FIG. 8 as component 12, will cause the apparatus to generate short (psec or nsec) bursts of light, rather than a long pulse. One specific example of such a system could involve $Fe^{2+}$:ZnSe as the saturable absorber optic for a $Cr^{2+}$:ZnSe laser. In this way the Fe:ZnSe optic will initially hold off the gain in the cavity by spoiling the Q ("quality factor"), until the $Fe^{2+}$ absorption becomes saturated (i.e., bleached to transparency) such that a short intense pulse is generated by the laser apparatus.

The ZnS, ZnSe, ZnTe, CdS, CdSe and CdTe crystals can be produced in two material forms: as a single crystal or as a fused polycrystalline material. In either case the transition metal doped crystal is judged to be useful as gain media and saturable absorbers.

While particular methods, materials, parameters, etc. have been described and/or illustrated, such is not intended to limit the scope of this invention. Modifications and changes will become apparent and it is intended that the scope of the invention be limited only by the scope of the appended claims.

We claim:

1. A laser gain medium comprising:
   a host material selected from the group consisting of sulfides, selenides, and tellurides, and a transition metal ion dopant in the host material, wherein:
   said transition metal ion dopant is selected from the group consisting of Ti, V, Cr, Mn, Fe, Co, Ni, and Cu;
   said host material has a crystal structure having four fold coordinated substitutional sites;
   said transition metal ion dopant is substituted at said four-fold coordinated sites: and
   excitation means associated with the host material and transition metal ion dopant for pumping optical energy directly to the energy levels of the transition metal ion dopant.

2. The laser gain medium of claim 1, wherein said host material is a II–VI compound having the formula MX, where M is a divalent cation selected from the group consisting of Mg, Zn, and Cd, and X is a divalent anion selected from the group consisting of S, Se and Te.

3. The laser gain medium of claim 2, wherein said gain medium is a polycrystalline material.

4. The laser gain medium of claim 2, wherein said host material is selected from the group consisting of ZnS, ZnSe, ZnTe, CdS, CdSe and CdTe.

5. The laser gain medium of claim 4 wherein the transition metal ion is $Cr^{2+}$.

6. The laser gain medium of claim 4 wherein the transition metal ion is $Fe^{2+}$.

7. The laser gain medium of claim 1, wherein said host material has the formula $MY_2X_4$, where M is selected from the group consisting of Zn, Cd, Ca, Sr and Ba, Y is selected from the group consisting of Ga and In, and X is selected from the group consisting of S, Se and Te.

8. A laser gain medium comprising:
   a host material selected from the group consisting of oxides, sulfides, selenides, tellurides, fluorides, chlorides, bromides, and iodides, and a transition metal ion dopant in the host material, wherein:
   said transition metal ion is characterized by the $3d^4$, $4d^4$, $5d^4$, $3d^6$, $4d^6$, or $5d^6$ electronic structure and by ground and excited states described by $^5T_2$ and $^5E$ tetrahedral symmetries;
   said host material has a crystal structure having four fold coordinated substitutional sites;
   said transition metal ion dopant is substituted at said four-fold coordinated sites.

9. The laser gain medium of claim 8 wherein:
   said host material is selected from the group consisting of sulfide, selenide and telluride host materials;
   said transition metal ion dopant is selected from the group consisting of Ti, V, Cr, Mn, Fe, Co, Ni, and Cu.

10. The laser gain medium of claim 8 wherein the transition metal ion is $Cr^{2+}$.

11. An optical element comprising:
    an intracavity saturable absorber for use in a laser and formed of a transition metal ion doped host material, wherein:
    said transition metal ion is selected from the group consisting of Ti, V, Cr, Mn, Fe, Co, Ni and Cu; and
    said host material is a II–VI compound having the formula MX, where M is a divalent cation selected from the group consisting of Mg, Zn and Cd, and X is a divalent anion selected from the group consisting of S, Se and Te.

12. The saturable absorber of claim 11, wherein said saturable absorber is a polycrystalline material.

13. The saturable absorber of claim 11 wherein the transition metal ion is selected from the group consisting of $Cr^{2+}$ and $Fe^{2+}$ and the host material is selected from the group consisting of ZnS, ZnSe, ZnTe, CdS, CdSe and CdTe.

14. A solid state laser, comprising:
    a laser gain medium comprising:
    a host material selected from the group consisting of oxides, sulfides, selenides, tellurides, fluorides, chlorides, bromides, and iodides, and a transition metal ion dopant in the host material, wherein:
    said transition metal ion is characterized by the $3d^4$, $4d^4$, $5d^4$, $3d^6$, $4d^6$, or $5d^6$ electronic structure and by ground and excited states described by $^5T_2$ and $^5E$ tetrahedral symmetries;
    said host material has a crystal structure having four fold coordinated substitutional sites;
    said transition metal ion dopant is substituted at said four-fold coordinated sites;
    excitation means associated with the gain medium for pumping the gain medium;
    cavity forming means surrounding the gain medium to form a resonant laser cavity;

energy extraction means associated with the cavity forming means to remove laser energy from the cavity.

15. The solid state laser of claim 14, wherein:

the host material is selected from the group consisting of sulfide, selenide and, telluride host materials;

the transition metal ion dopant is selected from consisting of Ti, V, Cr, Mn, Fe, Co, Ni, and Cu.

16. The solid state laser of claim 15, wherein said host material is a II–VI compound having the formula MX, where M is a divalent cation selected from the group consisting of Mg, Zn, and Cd, and X is a divalent anion selected from the group consisting of S, Se and Te.

17. The solid state laser of claim 16, wherein said gain medium is a polycrystalline material.

18. The solid state laser of claim 16, wherein said host material is selected from ZnS, ZnSe, ZnTe, CdS, CdSe and CdTe.

19. The solid state laser of claim 18 wherein the transition metal ion is selected from the group consisting of $Cr^{2+}$ and $Fe^{2+}$.

20. The solid state laser of claim 15, wherein said host material has the formula $MY_2X_4$, where M is selected from the group consisting of Zn, Cd, Ca, Sr and Ba, Y is selected from the group consisting of Ga and In, and X is selected from the group consisting of S, Se and Te.

* * * * *